(12) United States Patent
Pagliacci et al.

(10) Patent No.: US 10,429,667 B2
(45) Date of Patent: Oct. 1, 2019

(54) GLASSES FRAME WITH CLOSED POSITION PROTECTING LENSES FROM IMPACTS OR FRICTION

(71) Applicants: Gianfilippo Pagliacci, Milan (IT); Diego Ponzetto, Paderno Dugnano Mi (IT); Giuseppe Pizzuto, Palermo (IT); Dario Maria Fumagalli, Milan (IT); Luca Silvestri, Mogliano Veneto Tv (IT)

(72) Inventors: Gianfilippo Pagliacci, Milan (IT); Diego Ponzetto, Paderno Dugnano Mi (IT); Giuseppe Pizzuto, Palermo (IT); Dario Maria Fumagalli, Milan (IT); Luca Silvestri, Mogliano Veneto Tv (IT)

( * ) Notice: Subject to any disclaimer, the term of this patent is extended or adjusted under 35 U.S.C. 154(b) by 0 days.

(21) Appl. No.: 15/529,279

(22) PCT Filed: Nov. 23, 2015

(86) PCT No.: PCT/IB2015/059040
§ 371 (c)(1),
(2) Date: May 24, 2017

(87) PCT Pub. No.: WO2016/083976
PCT Pub. Date: Jun. 2, 2016

(65) Prior Publication Data
US 2017/0261764 A1    Sep. 14, 2017

(30) Foreign Application Priority Data

Jan. 23, 2015    (IT) .................. 102015902323302

(51) Int. Cl.
*G02C 5/00* (2006.01)
*G02C 5/14* (2006.01)
(Continued)

(52) U.S. Cl.
CPC ............... *G02C 5/006* (2013.01); *G02C 5/02* (2013.01); *G02C 5/08* (2013.01); *G02C 5/14* (2013.01)

(58) Field of Classification Search
CPC .......... G02C 5/006; G02C 5/005; G02C 5/04; G02C 5/045; G02C 5/02; G02C 5/08;
(Continued)

(56) References Cited

U.S. PATENT DOCUMENTS 1,509,723 A    9/1924    Fink
2,537,248 A    1/1951    Vigano
(Continued)

OTHER PUBLICATIONS

International Search Report, dated Mar. 9, 2016, from corresponding PCT application.

*Primary Examiner* — Marin Pichler
(74) *Attorney, Agent, or Firm* — Young & Thompson

(57) ABSTRACT

A glasses frame includes a front-frame and two temples (4, 5) connected to the front-frame through hinges which allow the rotation of the temples (4, 5) from a work position substantially perpendicular to the front-frame, to wear the glasses, as far as a home position substantially parallel to the front-frame, to put away the glasses. The front-frame includes two rims (2, 3) for lens support and possibly a bridge (1) connecting the rims and at least a pivoting element (C) apt to allow the mutual rotation by at least 180° of the rims (2, 3) around a rotation axis (X-X) substantially lying in a plane containing the two centers of the rims (2, 3) and perpendicular to the rims. The temples (4, 5) are directly hinged onto the rims (2, 3).

17 Claims, 11 Drawing Sheets

(51) Int. Cl.
*G02C 5/02* (2006.01)
*G02C 5/08* (2006.01)

(58) Field of Classification Search
CPC ... G02C 5/10; G02C 5/14; G02C 5/20; G02C 5/2263; G02C 1/06; G02C 1/08; B21F 45/002
USPC .............................. 351/115, 120, 95, 59, 63
See application file for complete search history.

(56) References Cited

U.S. PATENT DOCUMENTS

| | | |
|---|---|---|
| 3,880,503 A | 4/1975 | Uribe |
| 6,257,720 B1 | 7/2001 | Ozawa |
| 6,513,926 B1 * | 2/2003 | Kizu .................. G02C 5/006 2/454 |
| 8,833,933 B1 | 9/2014 | Huang |
| 2014/0268005 A1 * | 9/2014 | Pluta .................. G02C 5/006 351/63 |
| 2014/0340628 A1 | 11/2014 | Huang |

\* cited by examiner

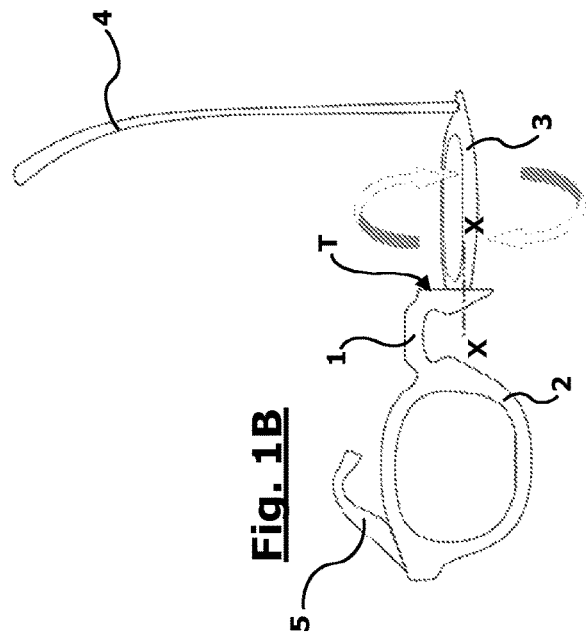
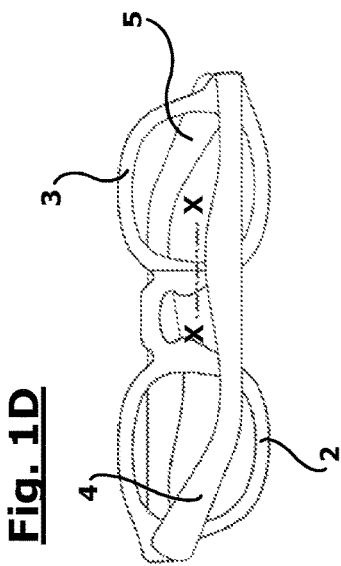
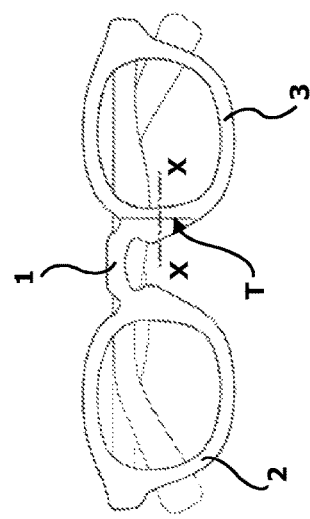
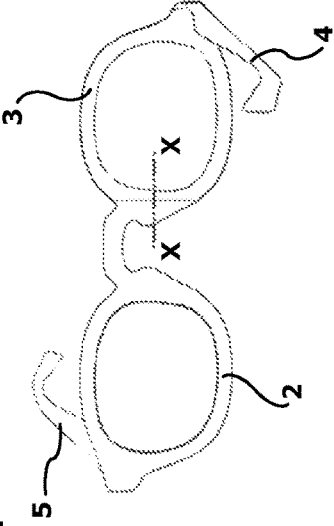
Fig. 1A
Fig. 1B
Fig. 1C
Fig. 1D

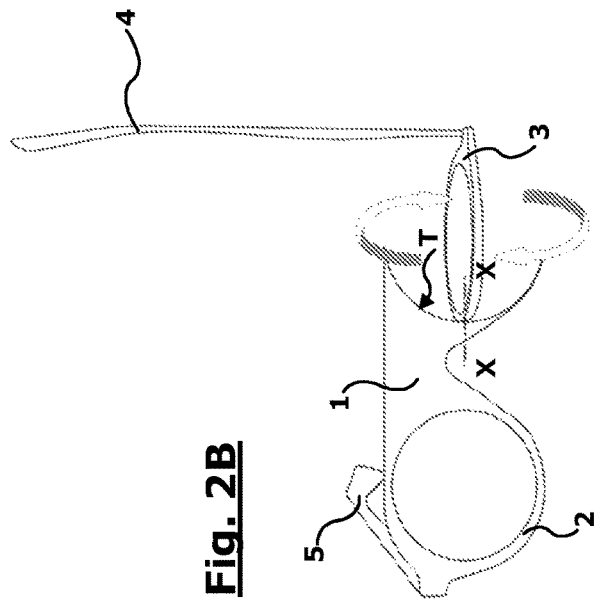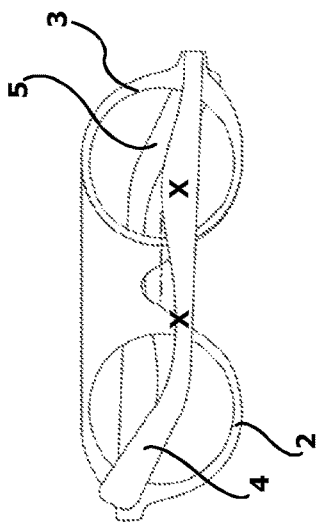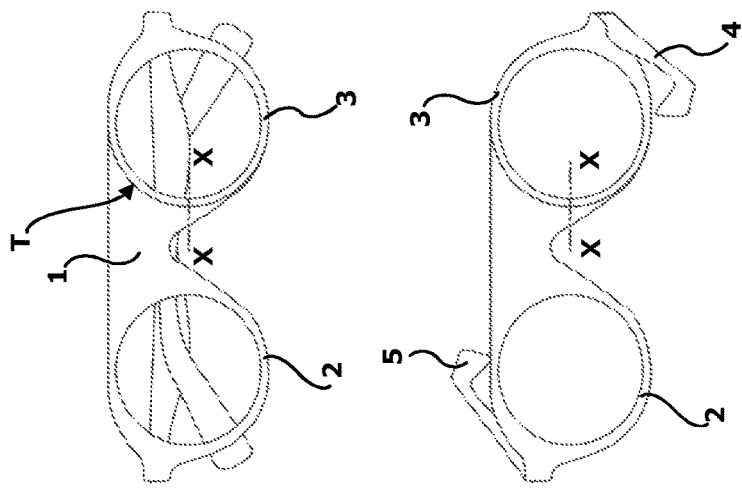

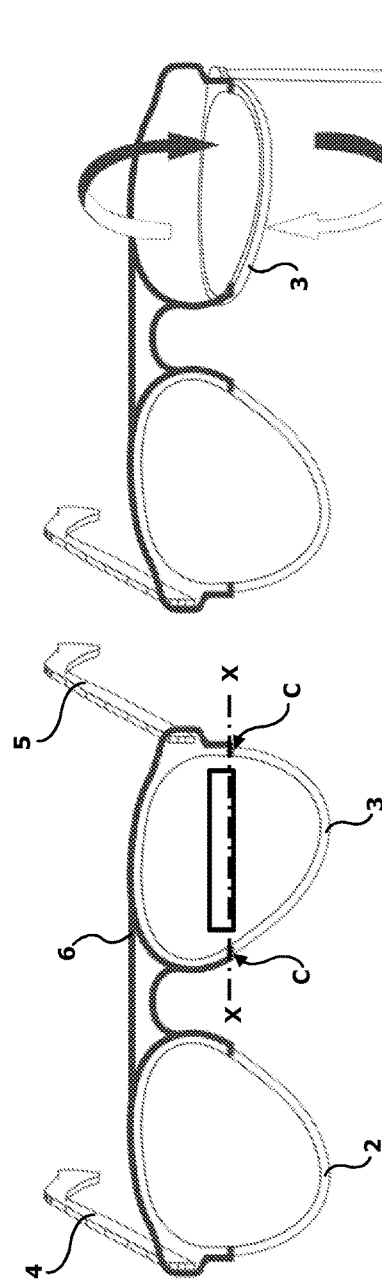# 
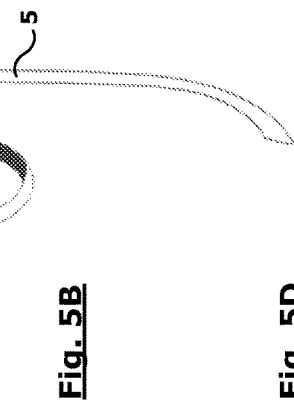
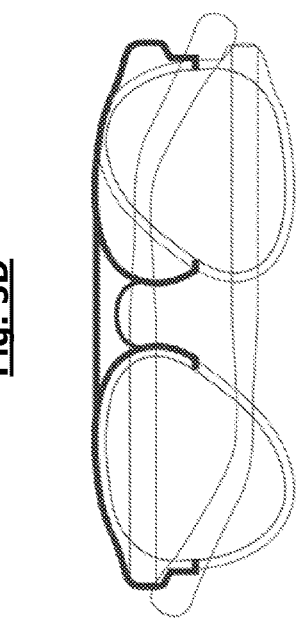
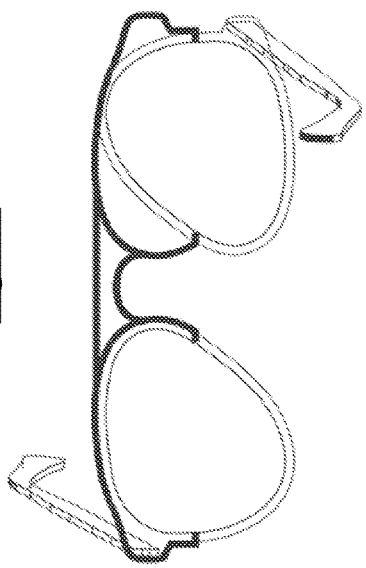
Fig. 5A
Fig. 5B
Fig. 5C
Fig. 5D

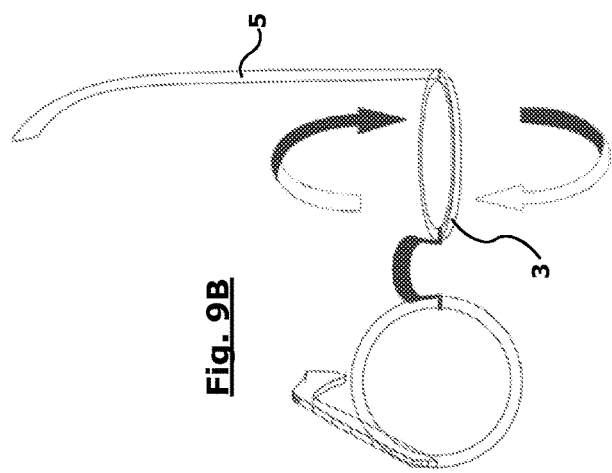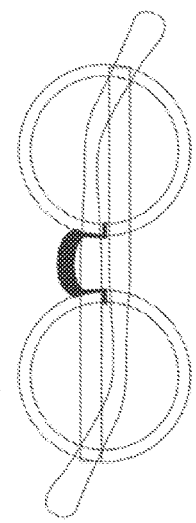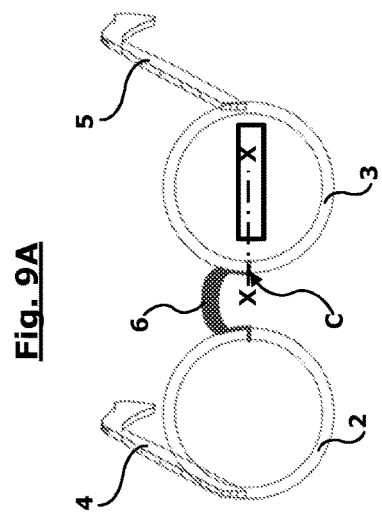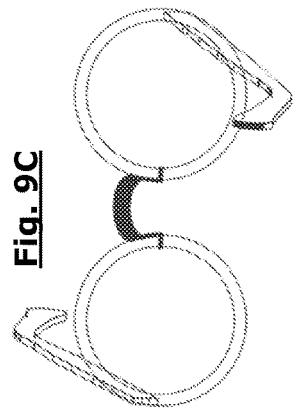

GLASSES FRAME WITH CLOSED POSITION PROTECTING LENSES FROM IMPACTS OR FRICTION

The present invention relates to a glasses frame with a closed position protecting the lenses from impacts or friction. In particular, the invention relates to a glasses frame of a completely new concept, capable of providing an excellent protection for the lenses when the glasses are not worn and are placed in a closed position onto a support, without them being inserted into a case.

FIELD OF THE INVENTION

It is known that in the daily use of glasses, be they sunshades or prescription glasses, there is often the need to take them off and put them back, depending on the conditions of use or on environmental conditions.

When taking off the glasses, they are often placed onto the first horizontal surface available, for example on the top of a piece of furniture or of a table, onto a chair or on a bed. Thereby, rarely does one have the time and the attention to gently and correctly place them—be it closed, that is, with the temples folded in contact with the resting surface, be it instead open resting on the top with the lower edge of the rims and the temple ends or, more stably, upside down, resting with the upper edge of the front-frame and of the temples—in any case in such a position that the lenses do not come in contact with the resting plane and hence do not risk being damaged.

As a matter of fact, more frequently, due to hurry, neglection or carelessness, the glasses are casually placed and hence often the lenses risk being damaged due to impacts or chafing against the same resting plane or surrounding objects.

The only means currently available to avoid in a sure manner any damage of the lenses is to put the glasses back into the case thereof, immediately after having taken them off. However, an operation of this type is complicated and too long to be carried out, at least in the fast context of modern social life, both due to the fact that the case is not always immediately available, and because the glasses often must be taken off and put on multiple times in rapid succession, depending on the conditions of use, and hence it is simpler to renounce to this more complete protection, in the light of the greater ease of an immediate support on the first available surface.

BACKGROUND ART

U.S. Pat. No. 6,257,720 discloses a glasses frame comprising a hinge means housed in the bridge connecting the two rims. Such hinge means allows the mutual rotation of the two frame rims—and of the temples hinged thereto—around a rotation axis passing through said bridge, so that after having rotated one of the two rims with respect to the other, the two temples are on opposite sides of the glasses and can thus provide protection to the lenses.

The solution disclosed by this patent, although interesting from a principle point of view, however, in actual fact cannot be applied in a satisfactory manner. As a matter of fact, it is well known that in glasses the connection bridge of the two rims, since it has to be positioned in contact with the user's nose or slightly above it, is arranged in the upper part of the front-frame, substantially aligned to the upper arc of said rims. It is hence evident that, by performing the 180° rotation of a rim with respect to the other one around a rotation axis formed within said bridge, once the rotation has occurred the two rims will be completely misaligned and the relative temples therewith.

The stated object of the patent is thereby not reached, since in the upside down position of the rims each temple nevertheless protects exclusively—as, on the other hand, occurs in a conventional pair of glasses—the inner part of the lens in a proximal position with respect to the hinge thereof, but it does not succeed instead in protecting with the terminal part thereof—as was instead in the stated intentions of the patent—the outer part of the lens in a distal position with respect to the hinge thereof due to the fact that during the 180° rotation the rim containing said lens has turned upside down with respect to the bridge and has hence fully misaligned with respect to the position occupied by the terminal part of the temple of the other rim. As a result the outer part of the lenses receives no serious protection from the terminal part of the temples in the above-said upside-down position, not allowing hence to achieve the improvement with respect to the preexisting situation disclosed in the patent in question.

In addition thereto, it must also be pointed out that in the above-said 180° upturned position of the two rims, the glasses take up a fully disassembled layout, with the two rims fully off-center with respect to the rotation axis around the nosepiece of the glasses and the terminal part of the relative temples thus occupies a substantially empty space. In other words, the bulk of the glasses in the plane in which the two rims lie is substantially doubled, with evident negative consequences both from a comfort point of view in putting away or handling the glasses, and from an aesthetic point of view.

The object of the present invention is hence to propose a glasses frame which offers the same innovative performances which have been proposed for the frames disclosed in U.S. Pat. No. 6,257,720, which performances are not obtained instead by the solution disclosed in such patent for the reasons set forth above. In particular hence, a frame which allows to avoid, in a very simple and immediate manner, the risk of damage of the lenses when putting the glasses in a closed position onto a resting plane.

Another object of the present invention is to offer a glasses frame which enjoys such innovative performances regardless of the material making up the frame, that is, in particular both for frames of plastic and metal or composite material, and of the specific glasses model.

These objects, are reached through a glasses frame of the type comprising a front-frame, two temples (4, 5) connected to said front-frame by hinges which allow the rotation of the temples (4, 5) from a work position substantially perpendicular to the front-frame, to wear the glasses, up to a home position substantially parallel to the front-frame, to put away the glasses, said front-frame comprising two rims (2, 3) for lenses support and possibly a bridge (1) connecting said rims and wherein there is provided at least a hinge means (C) apt to allow the mutual rotation by at least 180° of said rims (2, 3) around a rotation axis (X-X), characterised in that said rotation axis (X-X) substantially lies in a plane containing the two centres of said rims (2, 3) and perpendicular to the rims, and in that said temples (4, 5) are directly hinged onto the rims (2, 3). Other preferred features of such frame are defined in the dependent claims.

BRIEF DESCRIPTION OF THE DRAWINGS

Further features and advantages of the frame according to the present invention will in any case be more evident from the following detailed description of some preferred embodiments of the same, given as a mere non-limiting example and illustrated in the attached drawings, wherein:

FIG. 1A is a front view of a glasses frame according to a first variant of a first embodiment of the present invention with the temples folded onto the front-frame;

FIG. 1B is a view of the frame of FIG. 1A with the temples in an open position and with part of the frame rotate by 90° with respect to the other;

FIG. 1C is a view of the frame of FIG. 1B with said one part further rotated as far as 180° from the original position;

FIG. 1D is a view of the frame of FIG. 1C with the temples in a closed position;

FIGS. 2A to 2D are similar views to FIGS. 1A to 1D, which illustrate a second variant of the first embodiment of the glasses frame of the present invention;

FIG. 5A is a front view of a glasses frame according to a first variant of a second embodiment of the present invention with the temples in a standard open position;

FIG. 5B is a view of the frame of FIG. 5A with a part of the frame rotated by 90° with respect to the other;

FIG. 5C is a view of the frame of FIG. 5B with said one part further rotated as far as 180° from the original position;

FIG. 5D is a view of the frame of FIG. 5C with the temples in a closed position;

FIGS. 9A to 9D are similar views to FIGS. 5A to 5D, which illustrate a fifth variant of the second embodiment of the glasses frame of the present invention;

DETAILED DESCRIPTION OF THE PREFERRED EMBODIMENTS

Figure 3A:
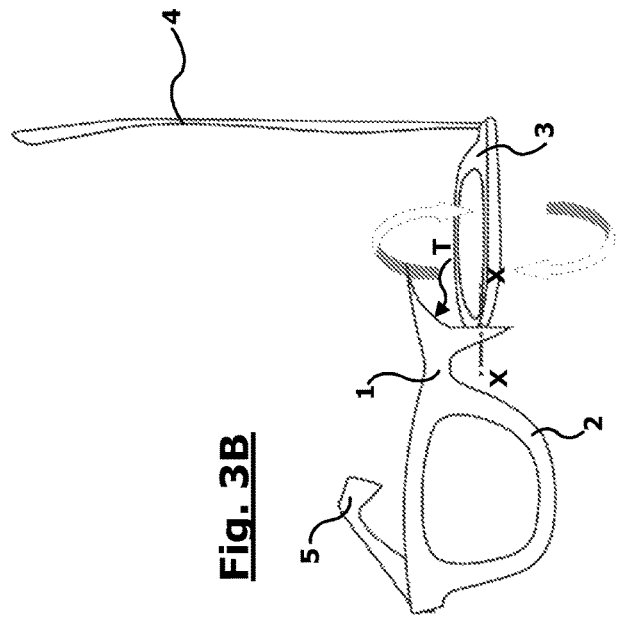
FIGS. 3A to 3D are similar views to FIGS. 1A to 1D, which illustrate a third variant of the first embodiment of the glasses frame of the present invention.

As shown in the drawings, the glasses frame according to the present invention looks like, when in a work position, any other currently used frame on the market and is not limited to a special design of the rims or of the temples. Such frame hence comprises all the usual components of a conventional pair of glasses and, in particular: a front-frame consisting of two rims 2, 3, centrally connected by a bridge 1, on the outer portion of said rims, or endpiece, the hinges for two respective temples 4 and 5 being inserted.

According to the idea of general solution of the present invention, in order to overcome the drawbacks of the above-described prior art and thus achieve the desired object of a complete protection of both sides of the lenses when either one of the two rims is rotated by 180° with respect to the other one, the mutual pivoting means C of said rims are not formed in bridge 1, but rather in an asymmetrical and eccentric area with respect to bridge 1, so as to also affect at least one portion of one of rims 2, 3. More precisely, in order for the glasses frame of the present invention to offer the best performances in terms of lens protection, the position of said pivoting means C must be such that the relative mutual rotation axis X-X passes as close as possible to the centre of rims 2 and 3 or, in other words, that such axis lies in a plane passing through the centres of rims 2 and 3 and perpendicular to said rims.

When said rims do not have a regular circular shape, under "centre" of rims 2, 3 a point is meant arranged in a central position of the rims and equidistant from the upper and lower extreme points of the rims. As a matter of fact, by arranging the rotation axis X-X in this central position of the front-frame, the mutual 180° rotation of rim 3 does not imply any vertical misalignment of the same with respect to rim 2 and this allows to enjoy a perfect protection of the lenses arranged therein, by temples 4 and 5. At the same time, this condition also allows to maintain a highly compact layout of the glasses in the upside down position, due to the alignment of the two rims in the lying plane thereof (which plane is substantially vertical when reference is made to the standard lying of the rims in conditions of use) as well as to the opposite arches layout (elongated S shape) which the front of the glasses takes up with respect to the horizontal direction when the camber of the two rims and of the lenses thereof faces opposite sides.

Figure 3B:
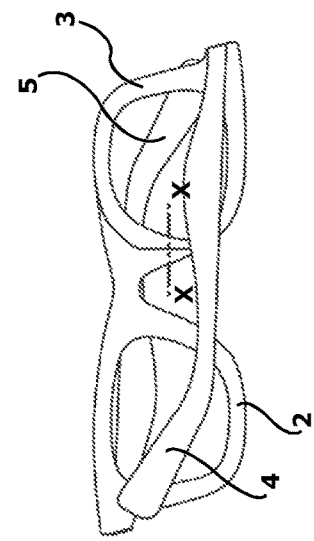
Figure 3C:
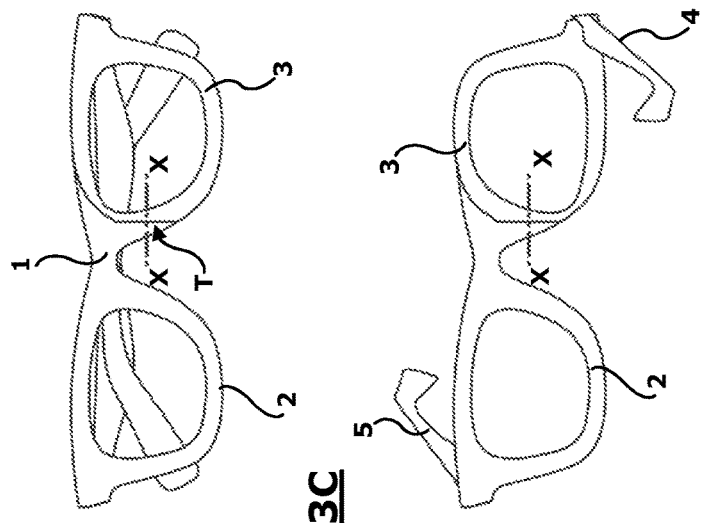
Figure 3D:
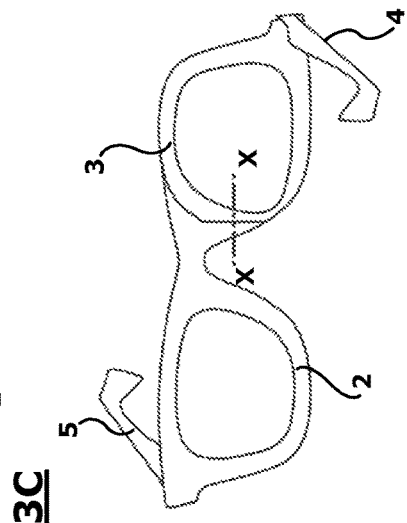
Figure 4B:
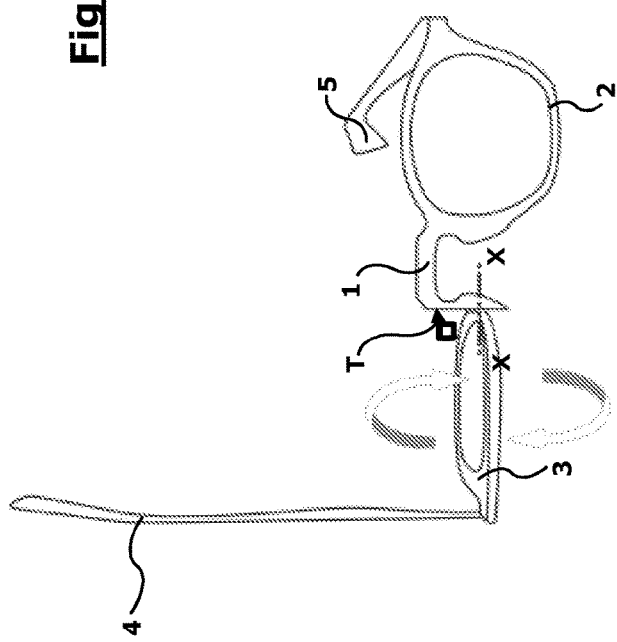
FIGS. 4A to 4D are similar views to FIGS. 1A to 1D, which illustrate a fourth variant of the first embodiment of the glasses frame of the present invention.
Figure 4D:
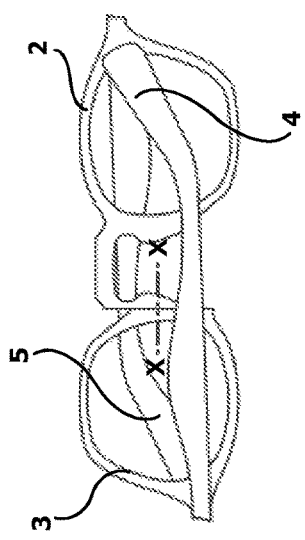
Figure 4A:
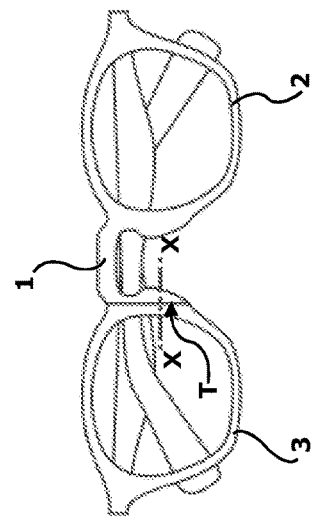
Figure 4C:
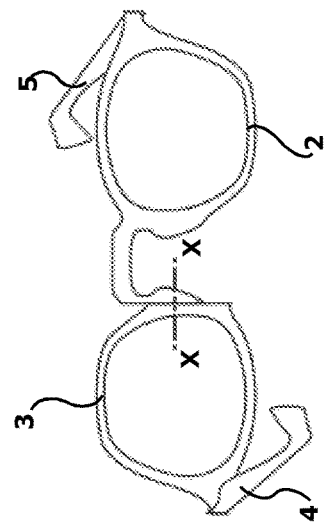

In a first embodiment, illustrated in four different shape variants in FIGS. 1 to 4, and particularly suited to frames of plastic material, it can be noticed that the frame according to the invention is characterised by a separation surface T—which surface may be planar or curved and which divides the frame into two parts, separating rim 2 and the temple 5 thereof from rim 3 and the temple 4 thereof—in correspondence of which there are provided pivoting means C, essentially consisting of a pin and supporting seats thereof, apt to allow the connection and mutual rotation of said two parts of the frame.

Unlike what is taught in the prior art discussed above, the surface T cuts the front of the glasses in an asymmetrical and eccentric position with respect to bridge 1, so as to affect also at least one portion of one of rims 2, 3 (rim 3 in the drawings) to such an extent as to allow the installation of mutual pivoting means C of the two rims 2 and 3 in correspondence of the above-said central position of the rims.

Due to this rotation opportunity, when the user wishes to take off the glasses, to put them onto a resting surface or other, at the very time he/she takes the glasses off his/her head, he/she can—by gripping a rim with one hand and the other rim with the other hand—rotate one by 180° with respect to the other, around axis X-X.

By doing so, the glasses frame takes up the final position clearly visible in drawings 1C, 2C, 3C and 4C, due to which, when the two temples 4 and 5 of the glasses are closed by their usual rotation movement, they will overlap on the lenses on opposite sides of the front-frame body, perfectly centred on the lenses; in other words, and more precisely, temple 4 will overlap and protect the rear face of rim 3 and the front face of rim 2 while temple 5 will overlap and protect the rear face of rim 2 and the front face of rim 3.

This position is defined here as "safety" position; as a matter of fact, whatever the plane on which the user can rest, or even let fall the glasses, the lenses will always be protected and maintained at a distance from the resting surface by temples 4 and 5 which, due to the alignment of rims 2 and 3, maintained also in the 180° upturned position thereof, are always perfectly overlapping the lenses. Practical tests have shown that, even in the case of accidental dropping of the glasses, closed in this safety position, any damage to the lenses is avoided. As a matter of fact, since the impact, in any dropping position, affects exclusively the frame and not the lenses, the elasticity typical of the frame material is sufficient to absorb the impact energy releasing it onto the lenses in a peripheral and distributed manner and hence without causing any damage to the same.

Again in the aforementioned practical tests, it was also possible to detect that the resting position of the glasses is remarkably different and advantageous with respect to the conventional one. In the glasses with folded temples in a conventional manner, as a matter of fact, the resting position is substantially horizontal, be the glasses rested on the side of the temples and on that of the lenses. On the contrary, in the glasses which use the frame according to the present invention, in a resting position the glasses are inclined in an intermediate position between the horizontal position and the vertical one, due to the fact that the resting occurs on the rim edge and on the back of the lowest temple. The glasses hence has two semi-vertical resting positions in stable equilibrium, fully similar and symmetrical, characterised by a reduced bulk of the glasses on the resting plane. These semi-vertical resting positions of the glasses, on the one hand remarkably ease the correct gripping of the glasses by the user since they increase the free gripping surface of the glasses and, on the other hand, they strongly reduce the risk of breaks of the glasses even in the case of an object accidentally rested or falling onto the glasses because such position eases the lateral sliding thereof. In FIGS. 1A-1D a first variant of the first embodiment of the glasses frame of the invention is shown, wherein the separation surface T consists of a plane arranged in correspondence of the lateral end of bridge 1, where said bridge engages with rim 3; the separation plane in this case hence affects also a partial portion of such rim. Such plane is preferably perpendicular or substantially perpendicular to the front-frame of the glasses. Thereby, and as clearly visible in FIGS. 1C and 1D, after having completed the mutual 180° rotation of the two parts of the glasses, the two rims 2 and 3 maintain the same alignment with respect to the vertical direction which they have in the standard position of use and the temples 4 and 5 consequently protect in an optimal and centered way both sides of the lenses arranged within rims 2 and 3.

However, the planar conformation of separation surface T is not limiting and the invention hence extends to frames wherein such surface has any curved shape, with the only limitation that such surface has a substantially symmetrical shape with respect to the rotation axis X-X, at least limited to portions of equal extension on both sides of such axis, to allow a match without interferences of the two parts of the glasses even in the position rotated by 180°. Preferably such surface is substantially perpendicular to the front-frame of the glasses.

In the second variant of the first embodiment of the invention, illustrated in FIGS. 2A-2D, separation surface T has for example a circular-section cylindrical shape, while in the third variant of the first embodiment of the invention, illustrated in FIGS. 3A-3D, separation surface T has a mixed-section cylindrical shape and precisely rectilinear close to the rotation axis X-X and circular in the areas more distant from such axis. It can be noticed that in such embodiment separation surface T has a different extension on the two sides of such axis, and precisely a greater extension in the upper part. In the fourth variant of the first embodiment of the invention, illustrated in FIGS. 4A-4D, separation surface T is again a planar surface and the frame has a bridge 1 in a high position. In this case rim 3 has shape discontinuity, in an upturned position, with respect to the other portion of the glasses and, however, here too the two rims 2, 3 maintain a perfect alignment with respect to the vertical direction.

It is hence evident that the shape of surface T separating the two parts of the glasses can have any position and shape, depending on the shape of the glasses frame and, specifically, of that of bridge 1, of rims 2 and 3 and of temples 4 and 5, so as to obtain a central position for axis X-X for upturning one part of the glasses with respect to the other part and a space sufficient for the insertion of pivoting means C.

In the four variants of the first embodiment illustrated in FIGS. 1, 2, 3 and 4, in which the separation surface of the two parts of the glasses is arranged in an eccentric position with respect to the centreline of bridge 1 there is, for the installation of pivoting means C, a greater space availability in a vertical direction than in a horizontal direction. This allows the installation of pivoting means C, also comprising positioning means, consisting, in a way known per se, of a small mobile cylinder arranged in a perpendicular direction to the rotation pin and thrust by spring means against a faceted portion of such pin. Thereby it is possible to impart to pivoting means C a number at will of halting positions, depending on the number of facets of the faceted portion of the pin, against which the cylinder finds a stable equilibrium position.

In the manufacturing and use tests of the frame according to the present invention, it has been ascertained as preferable that said rotation pin has a halt position every 90°, so as to offer an additional halt position between the work one and the safety one described above, to facilitate and make immediately guessable for the user the correct way of safely closing the frame of the present invention. In order to obtain this result it is evidently sufficient that the faceted portion of said pin has a square section.

According to another feature of the first embodiment of the present invention, with the rotation pin there are furthermore associated retaining means which avoid the coming off of said pin from the seats thereof and any elastic means apt to maintain mutually thrust in contact the two rims 2, 3 into the standard use position of the glasses, when the user releases the two rims after having caused them to mutually rotate.

In a second embodiment, particularly suited for metal glasses, the glasses frame with closed safety position of the present invention comprises a front-frame, consisting of a support frame 6 and of two rims 2, 3 fastened thereto, and of two temples 4 and 5, directly articulated on an external portion, or endpiece, of the two rims 2 and 3, through respective hinges.

Figure 6A:
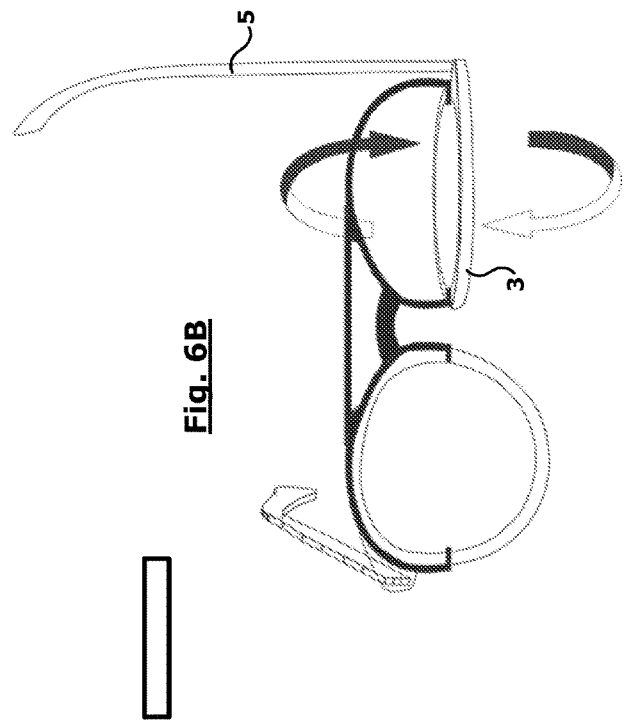
FIGS. 6A to 6D are similar views to FIGS. 5A to 5D, which illustrate a second variant of the second embodiment of the glasses frame of the present invention.
Figure 6B:
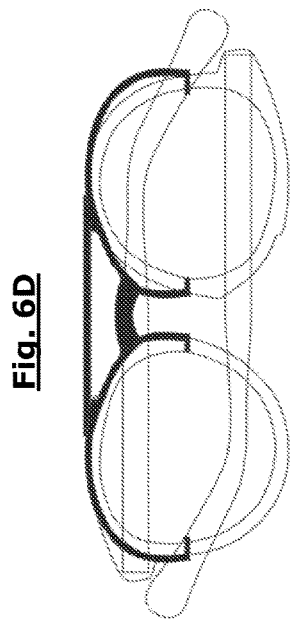
Figure 6C:
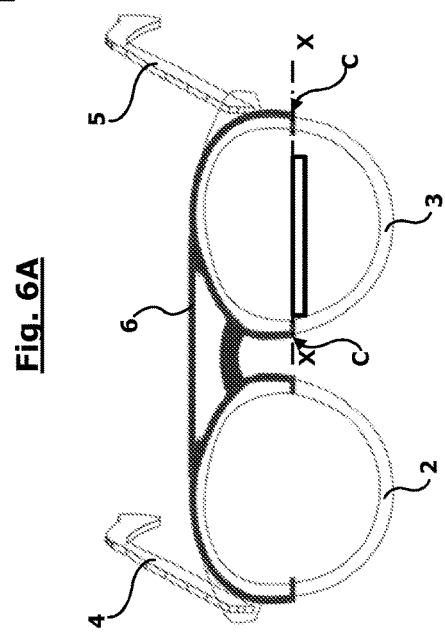
Figure 6D:
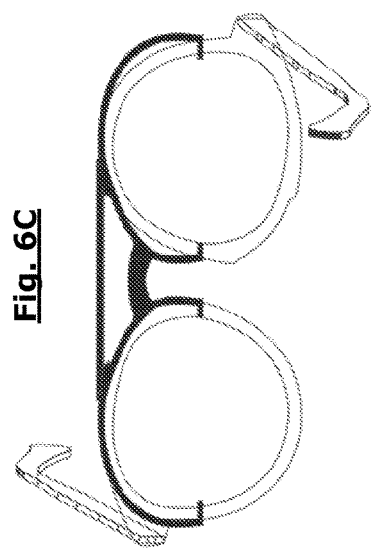
Figure 7A:
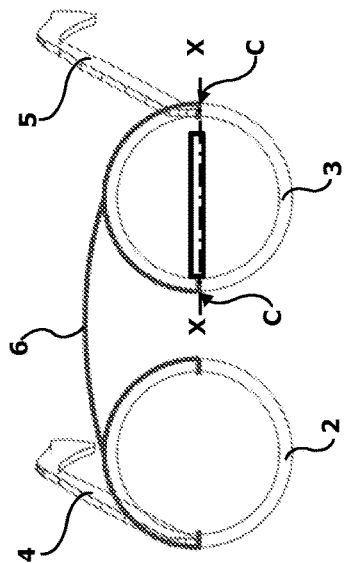
FIGS. 7A to 7D are similar views to FIGS. 5A to 5D, which illustrate a third variant of the second embodiment of the glasses frame of the present invention.
Figure 7B:
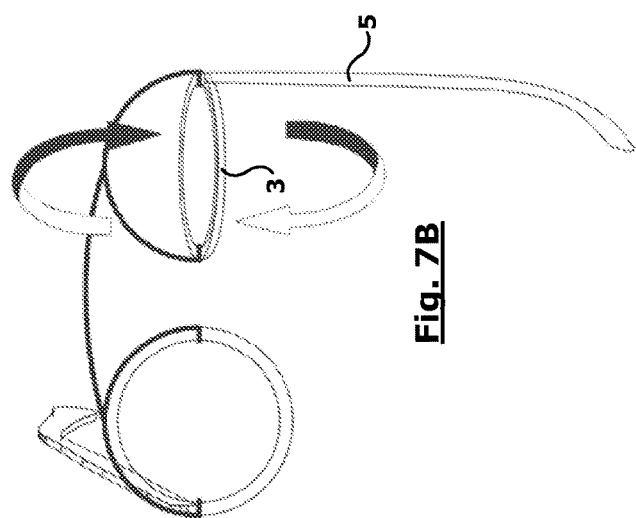
Figure 7C:
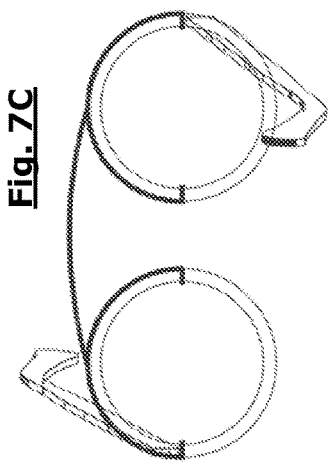
Figure 7D:
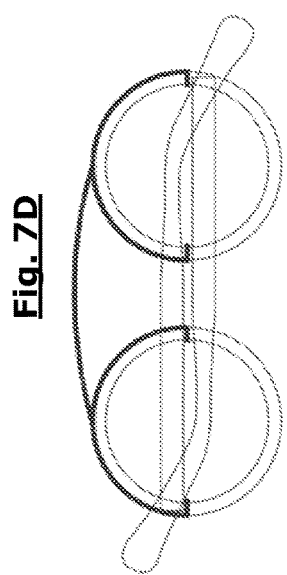
Figure 8B:
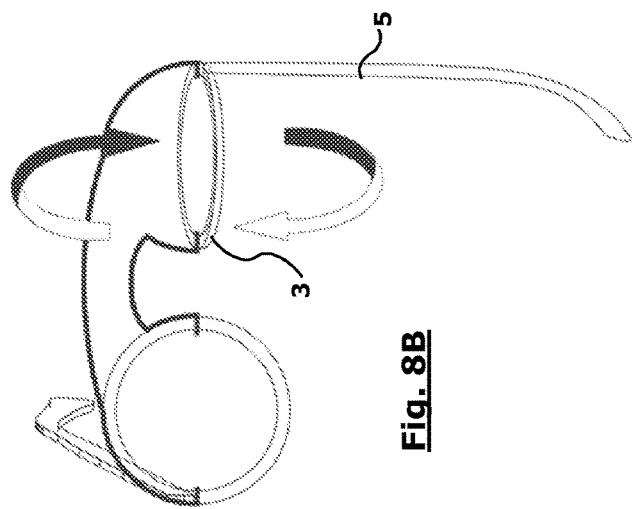
FIGS. 8A to 8D are similar views to FIGS. 5A to 5D, which illustrate a fourth variant of the second embodiment of the glasses frame of the present invention.
Figure 8D:
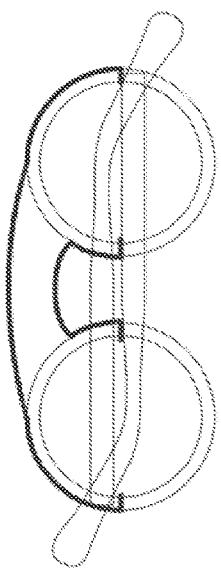
Figure 8A:
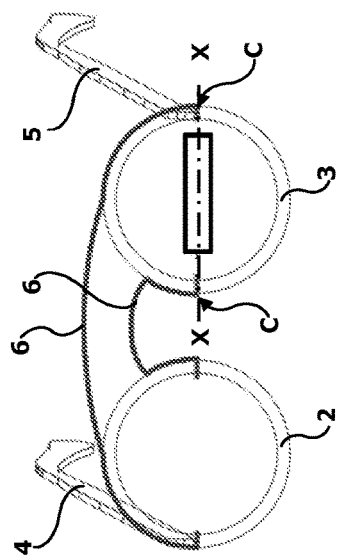
Figure 8C:
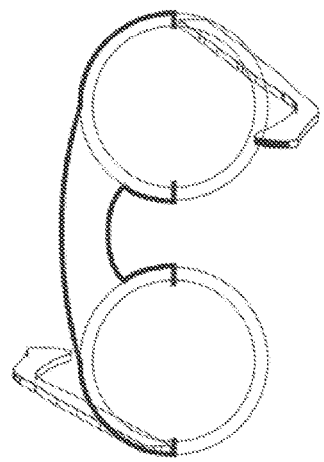
Figure 10A:
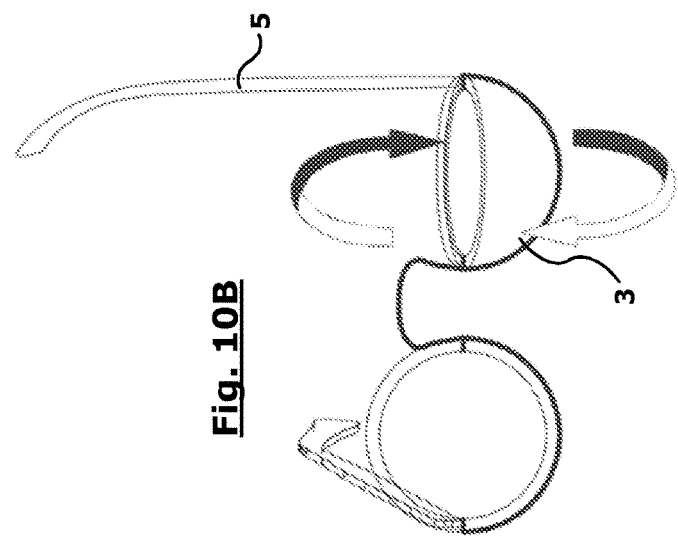
FIGS. 10A to 10D are similar views to FIGS. 5A to 5D, which illustrate a sixth variant of the second embodiment of the glasses frame of the present invention.
Figure 10B:
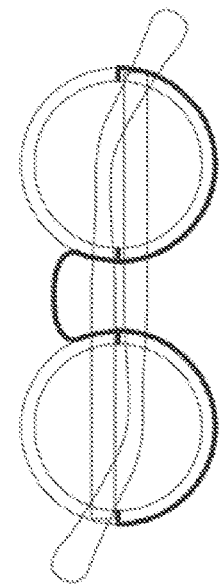
Figure 10C:
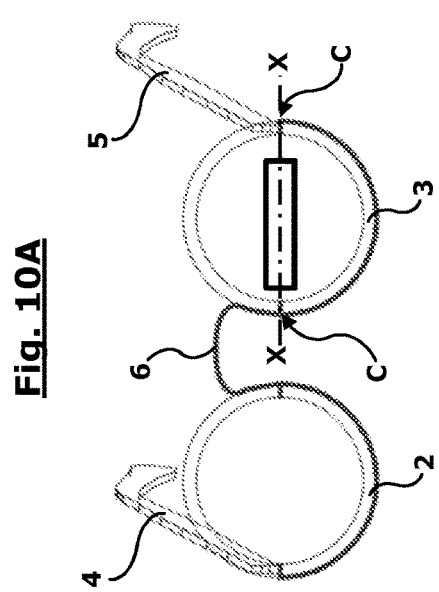
Figure 10D:
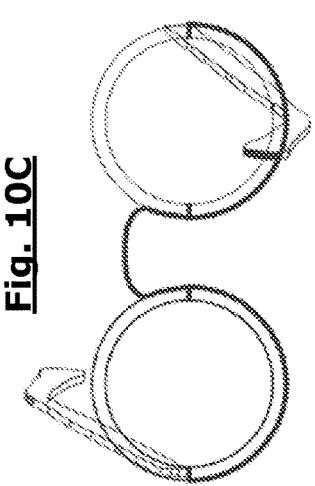
Figure 11A:
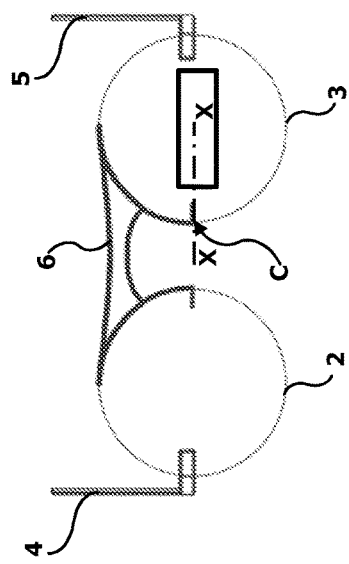
FIGS. 11A to 11D are similar views to FIGS. 5A to 5D, which illustrate a seventh variant of the second embodiment of the glasses frame of the present invention.
Figure 11B:
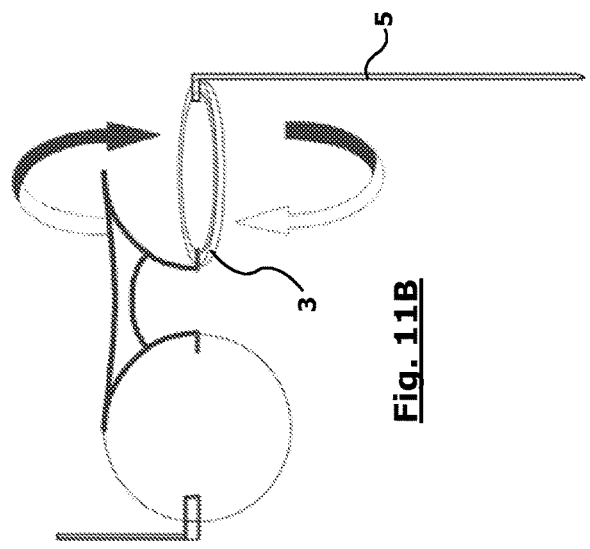
Figure 11C:
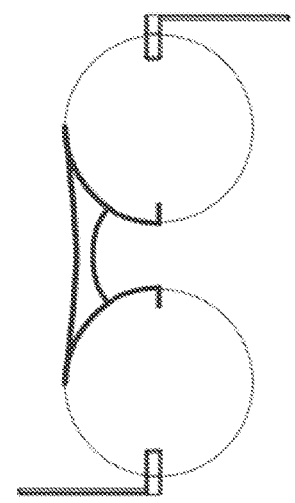
Figure 11D:
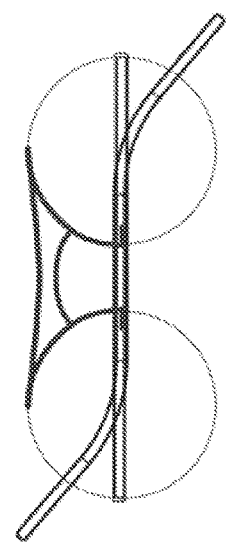

According to a peculiar feature of the present invention, at least one of the two rims 2 and 3 (in the drawings rim 3) is free to rotate with respect to support frame 6 and hence with respect to the other rim (in the drawings rim 2) around pivoting means C formed for this purpose in support frame 6. Said pivoting means C may be two, aligned and opposite on the two sides of rim 3, as in the embodiments illustrated in FIGS. 5 to 8 and 10, or one only, arranged on the internal side of rim 3, as in the embodiments illustrated in FIGS. 9 and 11. In any case, due to pivoting means C, rims 2 and 3 can rotate one with respect to the other, around an axis X-X passing through the same and substantially lying in a plane containing the two centres of rims 2 and 3 and perpendicular to the same. Since temples 4 and 5 are hinged directly onto rims 2 and 3, the mutual rotation of said rims implies also the rotation of said temples.

Due to this rotation opportunity, when the user wishes to take off the glasses, to place them onto a resting plane or other, at the very moment he/she takes off the glasses from his/her head he/she can repeat the manoeuvres already described in connection with the first embodiment of the frame of the present invention, obtaining the same positive effects.

In the preceding description, by the term "support frame" 6 it is preferably meant a low-thickness and high-resistance element—for example an element consisting of metal materials, carbon fibres or composite materials—capable of making up the load-bearing element of the frame which guarantees the desired solidity and stability over time thereof. Support frame 6 does not have a preferred or obliged layout and can hence extend with arbitrary shapes above or below rims 2, 3 as well as reducing to a single bridge connecting said rims, as illustrated for example in the embodiment of FIG. 9. The scope of protection of the invention, however, is not in any way limited to the use of such materials, so that support frame 6 may also be made of the plastic materials conventionally used in the field of eyewear, possibly stiffened by metal cores, without departing from the scope of the invention.

In the preceding description, by the term "rims" 2, 3 elements with a generally circular or quadrangular, even not regular, shape are understood, apt to be stably fastened to support frame 6 in a fixed or rotating manner, as described above, to stably contain within prescription glasses or sunshades, and to house the hinges supporting temples 4, 5. For rims 2, 3 any desired material can be used, either plastic or metal or composite. Equally comprised within the scope of protection of the present invention is the case in which rims 2, consist of the same prescription lenses or sunshades, as illustrated in the embodiment of FIG. 11, which lenses in this case perform the same functions described above in connection with the rims 2, 3 of the glasses frame, that is those of being able to be fastened to support frame 6 and to house directly in the very body thereof pivoting means C and the hinges of temples 4 and 5.

The shape and the structure of pivoting means C described above can vary, even to a significant extent, depending on the materials used for the building of support frame 6 and of rims 2, 3. Preferably said pivoting means C comprise retaining devices of rotating rim 3 and preferred halt points in the rotation, in a way fully similar to what has been described in connection with the first embodiment of the present invention.

From the preceding description it is clear how the frame of the present invention has fully met both the set objects, that is, that of providing a full protection of both faces of the lenses of a pair of glasses, when the relative rims are in a position upturned by 180°, regardless of the material of which the frame consists and of the shape of the same.

It is understood that the invention must not be considered limited to the special arrangements illustrated above, which make up only exemplifying embodiments thereof, but that different variants within the reach of a person skilled in the field are possible—in particular with reference to the layout of pivoting means C, which can take up any structure suitable for the purpose—without departing from the scope of protection of the invention, which is exclusively defined by the following claims.

The invention claimed is:

1. A glasses frame of the type comprising:
   a front-frame, comprising two rims (2, 3) for lens support, and a bridge (1) connecting said rims;
   hinges; and
   two temples (4, 5) connected to said front-frame through the hinges which allow the rotation of the temples (4, 5) from a work position substantially perpendicular to the front-frame, to wear the pair of glasses, as far as a home position substantially parallel to the front-frame, to put away the glasses, said temples (4, 5) being directly hinged onto the two rims (2, 3),
   wherein the front-frame further comprises at least one pivot mechanism (C) that allows mutual rotation by at least 180° of said rims (2, 3) around a rotation axis (X-X), wherein
   said at least one pivot mechanism is provided in an asymmetrical and eccentric area with respect to the bridge (1),
   said rotation axis (X-X) is substantially lying in a plane, wherein said plane contains the two centers of said rims (2, 3) and said plane is perpendicular to the rims.

2. The glasses frame as in claim 1, wherein, said front-frame is cut according to a surface (T) which runs through the frame in the area asymmetrical and eccentric with respect to said bridge (1) and divides the frame into two parts, each of the two parts comprising at least one portion of one of said rims (2, 3).

3. The glasses frame as in claim 2, wherein said surface (T) dividing the frame into two parts is substantially perpendicular to the front-frame of the glasses and has a planar or curved shape.

4. The glasses frame as in claim 3, wherein said surface (T) separating the frame into two parts runs through said rotation axis (X-X) and has a symmetrical shape with respect to the same, limited to portions of equal extension on the two sides of such axes.

5. The glasses frame as in claim 1, wherein said front-frame comprises a load-bearing frame (6) and the two rims (2, 3) fastened to the same, wherein at least one of said rims (2, 3) is fastened to said load-bearing frame (6) through one or more of said at least one pivot mechanism (C).

6. The glasses frame as in claim 5, wherein said at least one pivot mechanism (C) comprises two pivot mechanisms (C) which cooperate with opposite and aligned portions of said at least one rim (2, 3).

7. The glasses frame as in claim 5, wherein said at least one pivot mechanism (C) comprises a single pivot mechanism (C) which cooperates with an internal portion of said at least one rim (2, 3).

8. The glasses frame as in claim 5, wherein said load-bearing frame extends above said two rims (2, 3).

9. The glasses frame as in claim 5, wherein said load-bearing frame extends below said two rims (2, 3).

10. The glasses frame as in claim 1, wherein said pivot mechanism determines stable halt positions of said mutual rotation of the two rims (2, 3) in a first work position, wherein said two rims (2, 3) are aligned in the ordinary position of use, and in a second home position, wherein said two rims (2, 3) and the temples (4, 5) hinged thereto are rotated by 180° around said axis (X-X), with respect to said work position.

11. The glasses frame as in claim 10, wherein said pivot mechanism determines a third halt position, in an intermediate position between said first work position and said second home position.

12. The glasses frame as in claim 6, wherein said load-bearing frame extends above said two rims (2, 3).

13. The glasses frame as in claim 6, wherein said load-bearing frame extends below said two rims (2, 3).

14. The glasses frame as in claim 7, wherein said load-bearing frame extends above said two rims (2, 3).

15. The glasses frame as in claim 7, wherein said load-bearing frame extends below said two rims (2, 3).

16. The glasses frame as in claim 2, wherein,
    said front-frame is cut according to a surface (T) which runs through the frame in the area asymmetrical and eccentric with respect to said bridge (1) and divides the frame into two parts, each of the two parts comprising at least one portion of one of said rims (2, 3),
    said surface (T) dividing the frame into two parts is substantially perpendicular to the front-frame of the glasses and has a curved surface, and
    said surface (T) dividing the frame into two parts runs through said rotation axis (X-X) and has a symmetrical shape with respect to said rotation axis (X-X), limited to portions of equal extension on the two sides of said rotation axis (X-X).

17. The glasses frame as in claim 2, wherein,
    said front-frame is cut according to a surface (T) which runs through the frame in the area asymmetrical and eccentric with respect to said bridge (1) and divides the frame into two parts, each of the two parts comprising at least one portion of one of said rims (2, 3),
    said surface (T) dividing the frame into two parts is substantially perpendicular to the front-frame of the glasses and has a curved surface, and
    said surface (T) dividing the frame into two parts runs through said rotation axis (X-X) and has a symmetrical shape with respect to said rotation axis (X-X).

\* \* \* \* \*